United States Patent
Naganawa

(10) Patent No.: US 12,320,423 B2
(45) Date of Patent: Jun. 3, 2025

(54) ATTACHMENT STRUCTURE OF AUTO TENSIONER

(71) Applicant: Yanmar Power Technology Co., Ltd., Osaka (JP)

(72) Inventor: Hiroaki Naganawa, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 6 days.

(21) Appl. No.: 17/913,732

(22) PCT Filed: Feb. 17, 2021

(86) PCT No.: PCT/JP2021/005835
§ 371 (c)(1),
(2) Date: Sep. 22, 2022

(87) PCT Pub. No.: WO2021/192741
PCT Pub. Date: Sep. 30, 2021

(65) Prior Publication Data
US 2023/0111557 A1 Apr. 13, 2023

(30) Foreign Application Priority Data
Mar. 23, 2020 (JP) .................... 2020-051488

(51) Int. Cl.
| | | |
|---|---|---|
| F16H 7/12 | (2006.01) | |
| F16H 7/08 | (2006.01) | |
| B60K 25/02 | (2006.01) | |

(52) U.S. Cl.
CPC ...... *F16H 7/1281* (2013.01); *B60K 2025/022* (2013.01); *F16H 2007/0812* (2013.01);
(Continued)

(58) Field of Classification Search
CPC .. F16H 7/1281; F16H 2007/0812; F16H 7/12; F16H 2007/0865; F16H 2007/0893; F02B 67/06; B60K 2025/022
(Continued)

(56) References Cited

U.S. PATENT DOCUMENTS

| | | | |
|---|---|---|---|
| 2003/0171179 A1* | 9/2003 | Okuda | F16H 7/129 474/135 |
| 2008/0207367 A1 | 8/2008 | Bogner et al. | |
| 2011/0070984 A1* | 3/2011 | Kotzur | F02B 67/06 180/65.21 |

FOREIGN PATENT DOCUMENTS

| | | | |
|---|---|---|---|
| JP | 9-137851 A | 5/1997 | |
| JP | H09-137851 A | 5/1997 | |

(Continued)

OTHER PUBLICATIONS

JP 2005221036 A English Translation from Google Patents (Year: 2005).*

(Continued)

*Primary Examiner* — Henry Y Liu
*Assistant Examiner* — Mark K Buse
(74) *Attorney, Agent, or Firm* — NORTON ROSE FULBRIGHT US LLP

(57) ABSTRACT

An auto tensioner is supported on one side surface of a cylinder block (the outer surface of a front wall part) via a bracket. The auto tensioner includes: a tension pulley that is pressed against a belt; an arm that rotatably supports the tension pulley and is swingably supported to the bracket; and a hydraulic actuator that is supported by the arm and bracket to adjust the pressing force of the tension pulley to the belt using a predetermined position of the arm as a supporting point. The hydraulic actuator is disposed outside the water pump on the front wall part of the cylinder block.

20 Claims, 7 Drawing Sheets

(52) U.S. Cl.
CPC ............... *F16H 2007/0844* (2013.01); *F16H 2007/0846* (2013.01); *F16H 2007/0861* (2013.01); *F16H 2007/0865* (2013.01); *F16H 2007/0876* (2013.01); *F16H 2007/0893* (2013.01); *F16H 2007/0897* (2013.01)

(58) Field of Classification Search
USPC ........................................................ 474/110
See application file for complete search history.

(56) References Cited

FOREIGN PATENT DOCUMENTS

| JP | 2003262258 | A | | 9/2003 | |
|----|------------|---|---|--------|---|
| JP | 2005-214121 | A | | 8/2005 | |
| JP | 2005221036 | A | * | 8/2005 | ........... F16H 7/1281 |
| JP | 2007239902 | A | * | 9/2007 | |
| JP | 2013-189945 | A | | 9/2013 | |
| JP | 2013241962 | A | * | 12/2013 | |
| JP | 2015147454 | A | | 8/2015 | |
| JP | 5807731 | B1 | | 11/2015 | |
| JP | 2017141903 | A | * | 8/2017 | |
| JP | 2018141419 | A | * | 9/2018 | |
| JP | 2019-044941 | A | | 3/2019 | |
| JP | 6795427 | B2 | * | 12/2020 | |
| WO | WO-2017021599 | A1 | * | 2/2017 | ........... F16H 7/1281 |

OTHER PUBLICATIONS

JP 2015010639 A English Translation from Google Patents (Year: 2015).*
International Search Report dated Apr. 6, 2021 issued in corresponding PCT Application PCT/JP2021/005835.
Japanese Office Action dated Nov. 15, 2022 issued in JP Application No. 2020051488.

* cited by examiner

ATTACHMENT STRUCTURE OF AUTO TENSIONER

CROSS-REFERENCE TO RELATED APPLICATIONS

This application is a national stage application pursuant to 35 U.S.C. § 371 of International Application No. PCT/JP2021/005835, filed on Feb. 17, 2021 which claims priority under 35 U.S.C. § 119 to Japanese Patent Application No. 2020-051488 filed on Mar. 23, 2020, the disclosures of which are hereby incorporated by reference in their entireties.

TECHNICAL FIELD

The present invention relates to an attachment structure of an auto tensioner provided in an engine.

BACKGROUND ART

For example, PTL 1 describes the configuration of a power transmission unit that transmits rotational power of a crankshaft of an engine to auxiliary equipment, including a crank pulley, an auxiliary equipment pulley, a drive belt wrapped around both pulleys, and a belt tensioner that automatically adjusts the tension of the drive belt.

The belt tensioner includes a tension pulley that is pressed against the drive belt, an arm that rotatably supports the tension pulley and is swingably supported by a swinging pin fixed to the engine, and an auto tensioner that is a hydraulic actuator that urges the arm in one direction.

The auto tensioner, which is a hydraulic actuator, is disposed near a chain cover on the front surface of the engine.

CITATION LIST

Patent Literature

PTL 1: Japanese Patent Publication No. 5807731 (Japanese Unexamined Patent Publication No. 2016-176436)

DISCLOSURE OF INVENTION

Problems to be Solved by the Invention

In PTL 1, since the auto tensioner, which is a hydraulic actuator, is disposed near the chain cover of the engine, there is a risk that the damping characteristics of the auto tensioner may readily change under the influence of the engine heat.

In view of these circumstances, an object of the present invention is to provide an attachment structure of an auto tensioner that suppresses changes in the damping characteristics of a hydraulic actuator.

Means for Solving the Problems

According to the present invention, an attachment structure of an auto tensioner that automatically adjusts tension of a belt wrapped around a crank pulley and an auxiliary pulley disposed on one side surface of a cylinder block of an engine, wherein, the auto tensioner is supported on the one side surface of the cylinder block via a bracket, the auto tensioner includes a tension pulley that is pressed against the belt; an arm that rotatably supports the tension pulley and is swingably supported by the bracket; and a hydraulic actuator that is supported by the arm and the bracket to adjust a pressing force of the tension pulley against the belt while using a predetermined position of the arm as a fulcrum, and the hydraulic actuator is disposed on an outer side of a water pump on the one side surface of the cylinder block.

According to this configuration, since the hydraulic actuator is supported on the one side surface of the cylinder block via the bracket, the radiant heat from the cylinder block is blocked by the bracket so that the transmission of the radiant heat to the hydraulic actuator is suppressed.

Since the hydraulic actuator is disposed on the one side surface of the cylinder block near the water pump, it is difficult for the heat from the hotter parts of the cylinder block to be transferred to the hydraulic actuator.

Since these factors suppress in a change in the damping characteristics of the hydraulic actuator, the reliability of the auto tensioner is improved.

In the above-described attachment structure of the auto tensioner, it is preferred that the hydraulic actuator be a direct-acting cylinder; the tension pulley be supported at one end of the arm in a longitudinal direction; one end of the hydraulic actuator in a direction of extension and retraction be supported at the other end of the arm in the longitudinal direction; a middle portion of the arm in the longitudinal direction be swingably supported by the bracket via a support shaft; and the other end of the hydraulic actuator in the direction of extension and retraction is supported by a predetermined portion of the bracket.

Here, the embodiment clarifies the operation of the hydraulic actuator and the arm.

In the above-described attachment structure of the auto tensioner, it is preferred that a stopper to limit extension of the hydraulic actuator beyond a predetermined limit be disposed on the bracket.

This configuration is advantageous in avoiding accidental damage to the hydraulic actuator.

In the above-described attachment structure of the auto tensioner, it is preferred that a scale indicating a swinging angle of the arm and an indicator pointing to the scale be disposed on the bracket and the arm, respectively.

According to the above-described configuration, when the belt stretches over time, the stretching of the belt can be visually confirmed by the scale and the indicator. This makes it relatively easy to know when to replace the belt.

In the above-described attachment structure of the auto tensioner, it is preferred that the bracket have a work hole through which a support fixture to restrict the swinging angle of the arm passes, and the arm have a contacting portion that comes into contact with the support fixture.

According to this configuration, when maintenance of the belt is performed, the tension pulley is moved to loosen the belt by rotating the arm in one direction by a predetermined angle, and then the support fixture is inserted into the work hole and the contacting portion of the arm that was moved as described above is brought into contact with the support fixture, and thereby the arm can be supported so that it is immobile at a predetermined swinging angle. This can improve the maintainability of the belt.

Effect of the Invention

The attachment structure of the auto tensioner according to the present invention can suppress changes in the damping characteristics of the hydraulic actuator under the influence of engine heat. This improves the reliability of the auto tensioner according to the present invention.

DESCRIPTION OF EMBODIMENTS

The best embodiments of the present invention will now be described with reference to the accompanying drawings.

Figure 1:
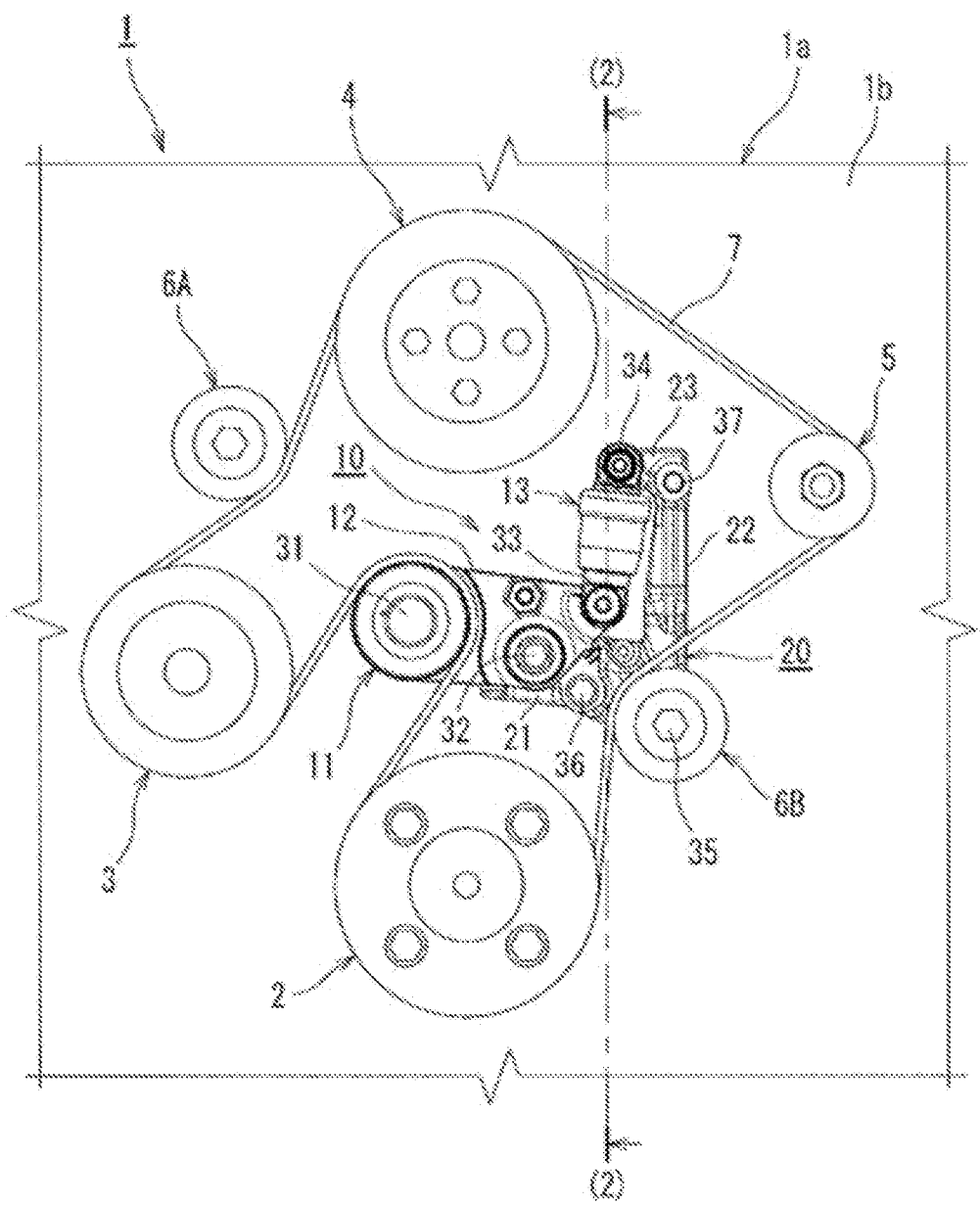
FIG. 1 is a front view of an embodiment of an attachment structure of an auto tensioner according to the present invention.

FIGS. 1 to 7 illustrate an embodiment of the present invention. As illustrated in FIG. 1, a power transmission unit that transmits the rotational power of a crankshaft (not illustrated) to auxiliary equipment (water pump, fan motor, alternator, etc.) on one side surface (for example, the outer surface of a front wall part 1a) of a cylinder block 1 of the engine.

The power transmission unit includes a crank pulley 2, auxiliary pulleys (a water pump pulley 3, a fan pulley 4, an alternator pulley 5, etc.), idler pulleys 6A and 6B, a belt 7 wrapped around each of the pulleys, and an auto tensioner 10 that automatically adjusts the tension of the belt 7.

The engine is a water-cooled engine that cools its cylinder head (not illustrated) and the cylinder block 1 with cooling water.

Since the tension of the belt 7 may fluctuate due to changes in the angular velocity of the crank pulley 2 and the load of the auxiliary equipment (not illustrated), the tension of belt 7 is automatically adjusted by the auto tensioner 10.

The auto tensioner 10 includes a tension pulley 11, an arm 12, a hydraulic actuator 13, and is attached to one side surface (an outer surface of the front wall part 1a) of the cylinder block 1 via a bracket 20.

The tension pulley 11 is pressed against the belt 7 and is rotatably supported via a bearing (not illustrated) at one end (left end) of the arm 12 in the longitudinal direction.

A central shaft bolt 31 is passed through a central hole of the tension pulley 11 (not illustrated), and the central shaft bolt 31 is screwed into a female threaded hole 12a on the left end side of the arm 12.

The arm 12 is composed of a plate material and is supported by the bracket 20 so that the arm 12 can swing around a fulcrum at a longitudinal midsection.

A cylindrical fulcrum boss 12b is disposed at the longitudinal midsection of the arm 12.

A support shaft bolt 32 serving as the support shaft is passed through a central hole 12c of the fulcrum boss 12b via a collar (not illustrated), and the support shaft bolt 32 is screwed into a female threaded hole 21a in the bracket 20.

In FIG. 1, when the tension of the belt 7 decreases or when the belt 7 is stretched, the arm 12 rotates clockwise by a predetermined angle around the support shaft bolt 32 serving as the fulcrum, and when the tension of the belt 7 increases, the arm 12 rotates counterclockwise by a predetermined angle around the support shaft bolt 32 serving as the fulcrum.

The rotation of the arm 12 by a predetermined angle in one direction and the opposite direction around the support shaft bolt 32 serving as the fulcrum is referred to as "swinging."

Although not illustrated in detail, the hydraulic actuator 13 is, for example, a known direct-acting cylinder.

The hydraulic actuator 13 automatically adjusts the tension of the belt 7 by extending and retracting to swing the arm 12 in response to the external force acting on the tension pulley 11 due to the tension fluctuation or stretching over time of the belt 7.

One end of the hydraulic actuator 13 in the direction of extension and retraction (the lower end of a housing 13a) is supported by the other end (the right end) of the arm 12 in the longitudinal direction via a first bolt (hex bolt) 33. The first bolt 33 is screwed into a female threaded hole 12d disposed on the right end side of the arm 12.

The other end of the hydraulic actuator 13 in the direction of expansion and contraction (the upper end of a piston 13b) is supported by an attachment piece 23 of a bar section 22 of the bracket 20 via a second bolt 34. The second bolt 34 is screwed into a female threaded hole 23a disposed on the attachment piece 23 of the bracket 20.

Figure 2:
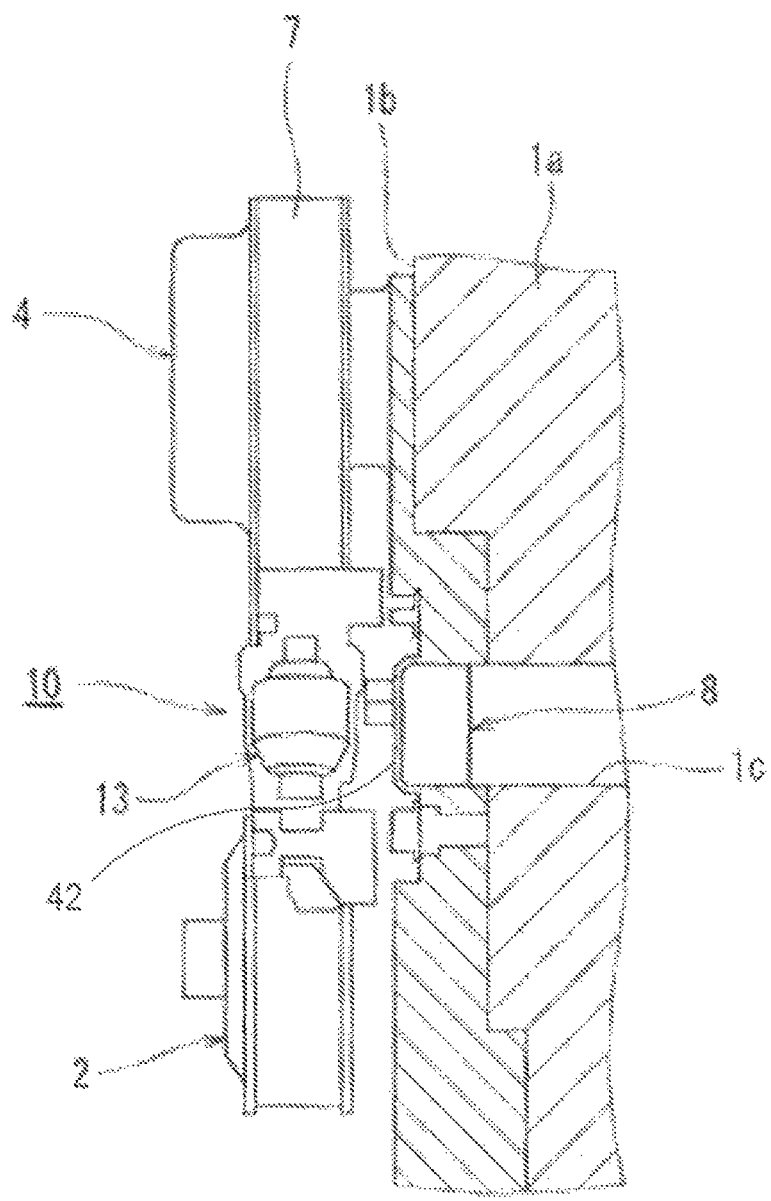
FIG. 2 is a schematic diagram of a cross-section taken alone line (2)-(2) in FIG. 1, viewed from the arrow direction.
Figure 3:
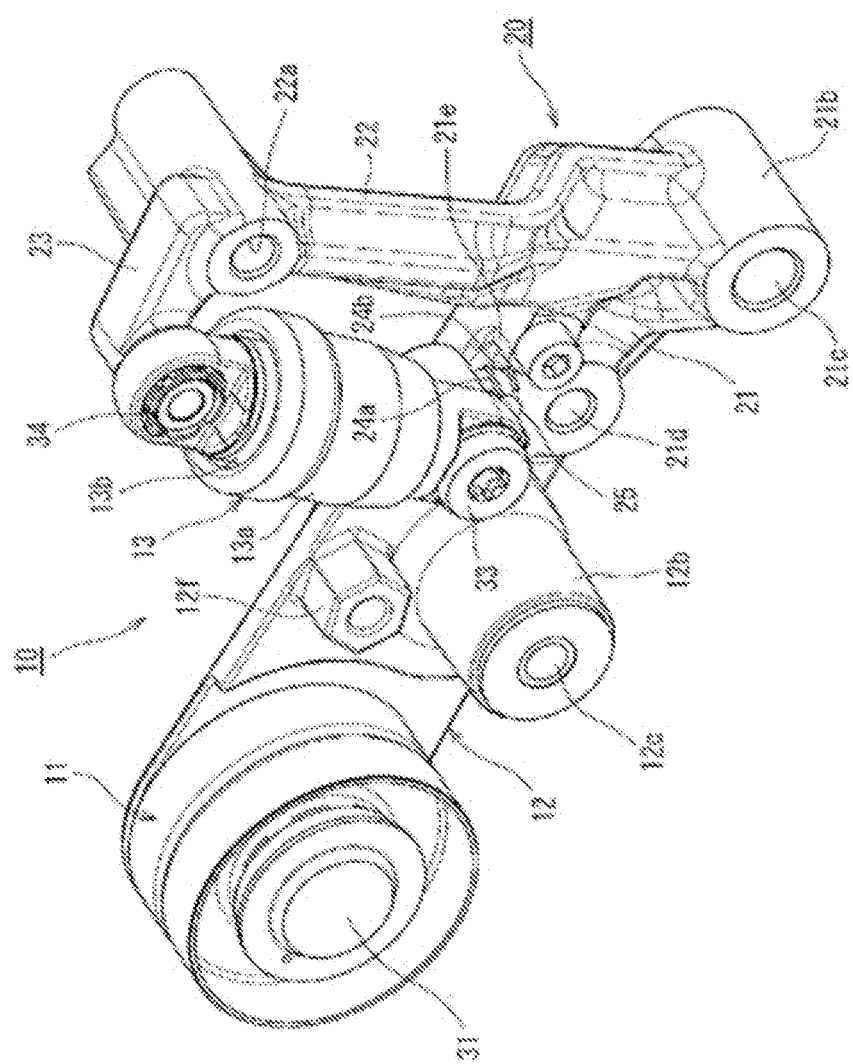
FIG. 3 is an enlarged perspective view of the auto tensioner.

As illustrated in FIG. 2, The hydraulic actuator 13 is disposed on the front wall part 1a of the cylinder block 1 on the outside of the installation area of a water pump 8 via the bracket 20. Note that the water pump 8 is connected to a water channel 1b in the cylinder block 1.

The bracket 20 has a planar section 21 and a bar section 22, and is fixed to the cylinder block 1, for example, with third, fourth, and fifth bolts 35, 36, and 37 (see FIG. 1).

Specifically, the female threaded hole 21a into which the support shaft bolt 32 of the arm 12 is screwed is disposed at the distal end (the portion connected to the bar section 22) of the planar section 21, and a cylindrical attachment boss 21b is disposed at the proximal end of the planar section 21.

The attachment piece 23 is disposed at the upper end of the bar section 22. The female threaded hole 23a is disposed at the distal end of the attachment piece 23.

The third, fourth, and fifth bolts 35, 36, and 37 are respectively passed through a central hole 21c of the attachment boss 21b, a through-hole 21d disposed near the attachment boss 21b of the planar section 21, and a through-hole 22a disposed at the upper end of the bar section 22, and the third, fourth, and fifth bolts 35, 36, and 37 are screwed into the front wall part 1a of the cylinder block 1.

An idler pulley 6B is rotatably supported at a predetermined position of the bracket 20. The idler pulley 6B is rotatably supported by the third bolt 35 passing through the central hole 21c of the attachment boss 21b of the bracket 20.

A stopper 21e d for restricting the extension of the hydraulic actuator 13 beyond a predetermined limit is disposed on the planar section 21 of the bracket 20.

Figure 4:
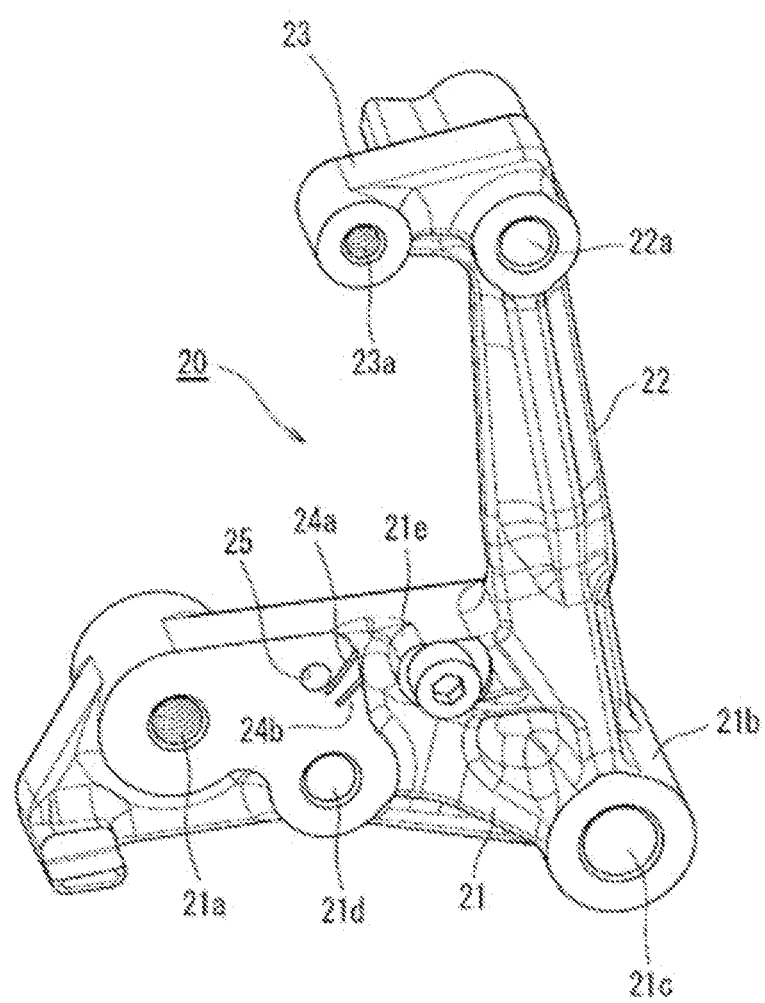
FIG. 4 is a perspective view of a bracket unit of the auto tensioner.
Figure 5:
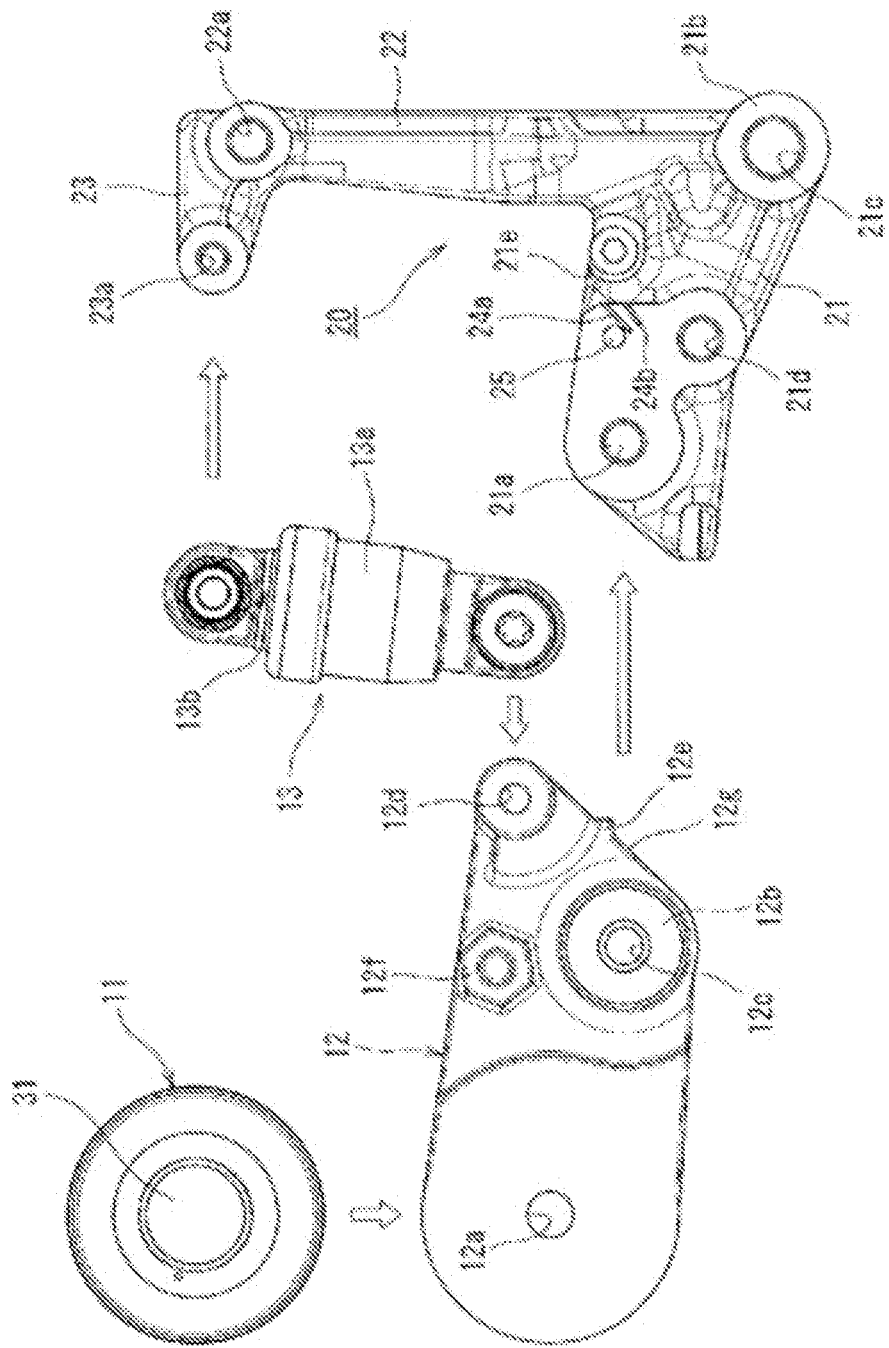
FIG. 5 is an exploded front view of the auto tensioner.

The stopper 21e of the present embodiment, as illustrated in FIGS. 4 and 5, is a thick convex surface disposed at the connecting portion of the bar section 22 and the planar section 21 of the bracket 20.

The stopper 21e receives an inclined surface 12g at the right end of the arm 12 to restrict the swinging (rotating) angle of the arm 12 in one direction (clockwise direction), for example, in order to restrict the extension of the hydraulic actuator 13 beyond a predetermined limit.

A first and second scales 24a and 24b that indicate the swinging angle of the arm 12 and an indicator 12e that points to first and second scales 24a and 24b are disposed on the bracket 20 and the arm 12, respectively.

In the present embodiment, the first and second scales 24a and 24b are disposed on the bracket 20, and the indicator 12e is disposed on the arm 12.

The first and second scales 24a and 24b are each a straight groove, and are disposed in a predetermined position on the front surface of the planar section 21 of the bracket 20, that is on the front surface corresponding to the right end of the arm 12.

The first scale 24a indicates a normal time during which the belt 7 is not stretched, and the second scale 24b indicates when to replace the belt 7 that has stretched beyond a specified limit.

The indicator 12e is, for example, a V-shaped projection, and is disposed on the inclined surface 12g on the right end of the arm 12 near the end corner.

Since the first and second scales 24a and 24b of the bracket 20 are immobile, and the arm 12 on which the indicator 12e is disposed rotates by a predetermined angle in a predetermined direction in accordance with the stretching of the belt 7, the tip of the indicator 12e of the arm 12 gradually rotates from the first scale 24a toward the second scale 24b as the belt 7 stretches over time.

This makes it relatively easy to know when to replace the belt 7 by, for example, being able to visually check the stretching of the belt 7.

During maintenance of the belt 7, etc., the maintainability of the belt 7 can be improved by using a work tool 40 for forcing the movement of the tension pulley 11 and the arm 12 in against the urging force of the hydraulic actuator 13 in a direction that reduces the tension of the belt 7, and a support fixture 50 for restricting the swinging angle of the arm 12 moved by the work tool 40.

Specifically, the work tool 40 is, for example, a ring wrench or ratchet wrench, and the support fixture 50 is, for example, a screwdriver or bar section.

A catch 12f for locking the work tool 40 is disposed near the fulcrum boss 12b in the middle region in the longitudinal direction of the arm 12.

The catch 12f has a hexagonal convex outer surface. However, the catch 12f can be, for example, a convex portion having a hex lobe (hexagonal star) hole on the end surface, in which case the work tool 40 should be a hex lobe wrench (such as a Torx wrench (trademarked)).

A work hole 25 into which a shaft portion of a screwdriver or bar section, etc. serving as the support fixture 50 is disposed near the first and second scales 24a and 24b on the planar section 21 of the bracket 20 (near the fixed portion at the lower end of the hydraulic actuator 13). The work hole 25 is a circular hole.

Figure 6:
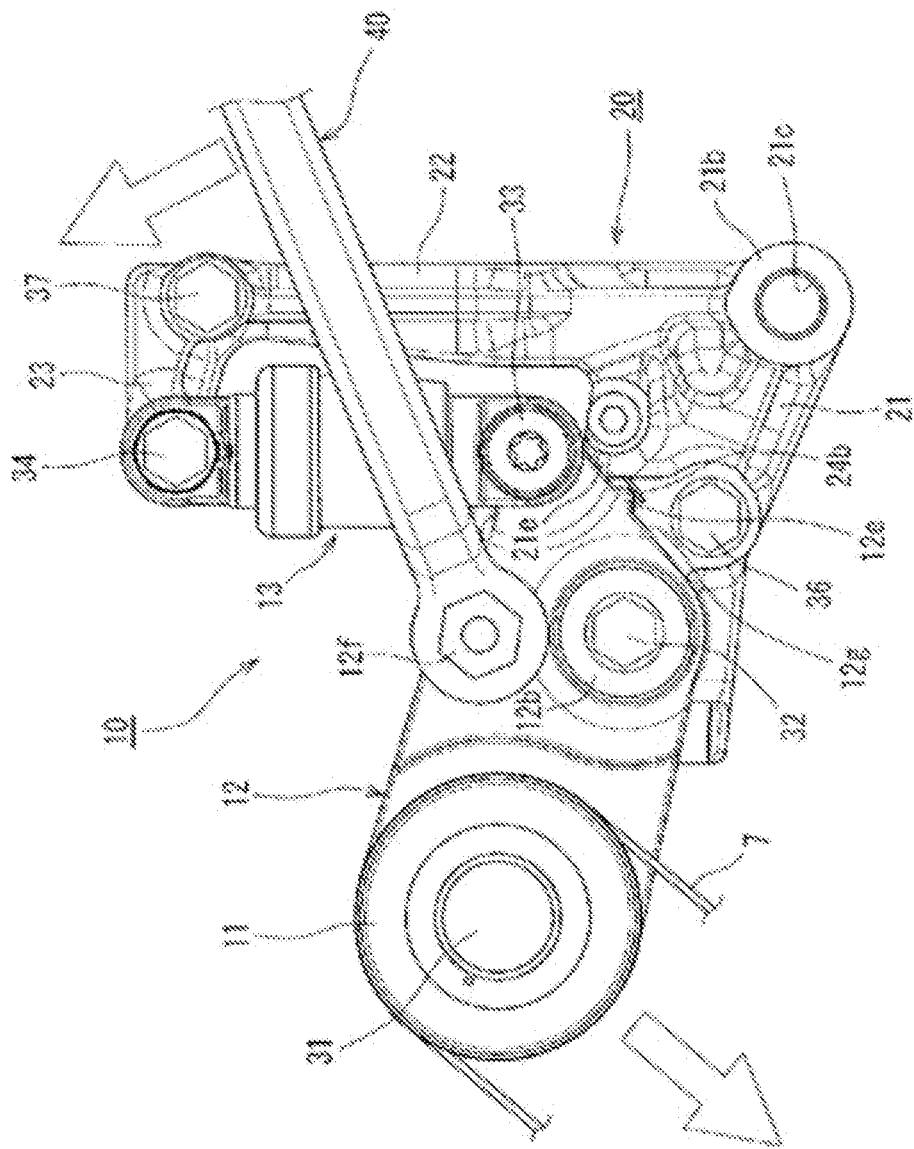
FIG. 6 is a front diagram illustrating the initial operation of maintenance of a belt.
Figure 7:
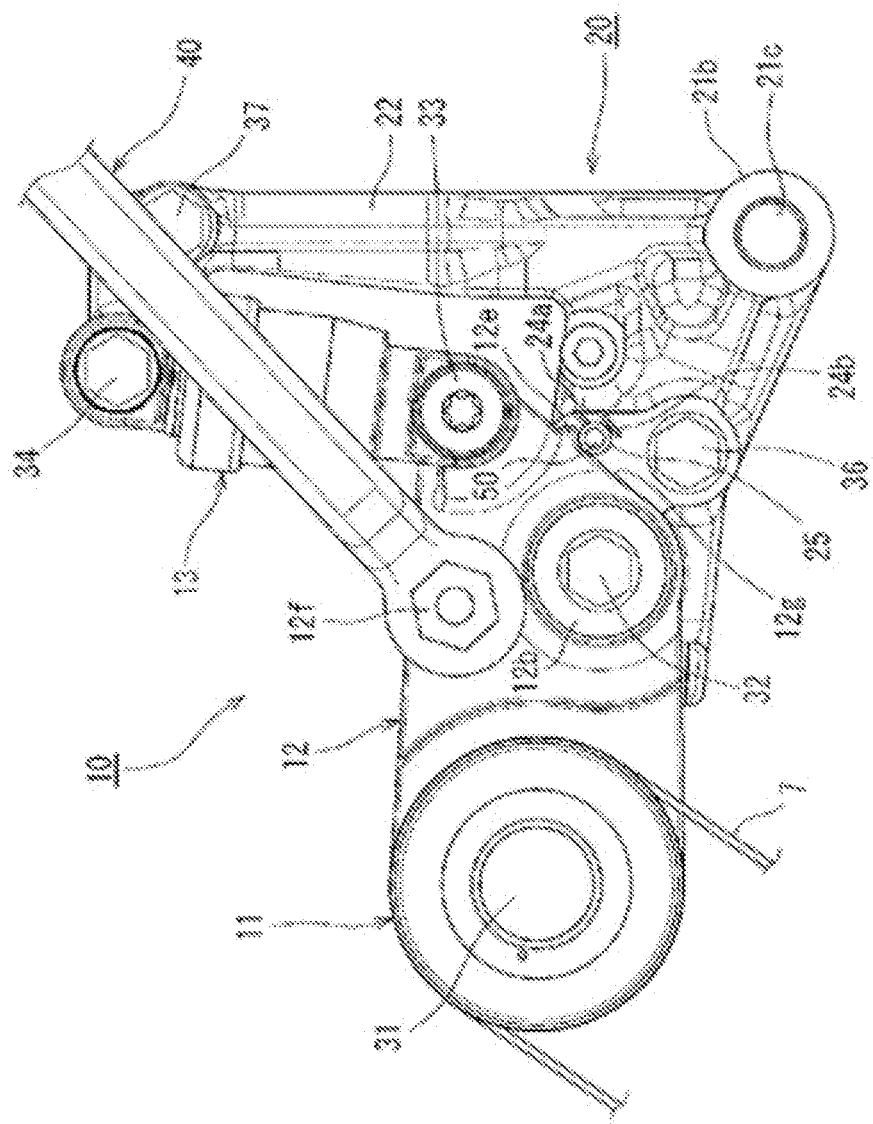
FIG. 7 is a front diagram illustrating the operation following FIG. 6.

Specifically, if the belt 7 has been stretched beyond a predetermined length and should be replaced when performing maintenance on the belt 7, the work hole 25 hidden by the arm 12 in FIG. 6 is exposed as in FIG. 7 by moving the tension pulley 11 so as to loosen the belt 7 by rotating the arm 12 in one direction (see the white arrow in FIG. 6) by a predetermined angle with the work tool 40 while the work tool 40 is in a state engaged to the catch 12f.

The support fixture 50 is inserted into the work hole 25, and the inclined surface 12g (corresponding to a contacting portion) of the arm 12, which has been moved as described above, comes into contact with the support fixture 50 so as to support the arm 12 in an immobilized manner, as illustrated in FIG. 7. This can improve the maintainability of the belt 7.

As described above, in the embodiment in which the present invention is applied, since the hydraulic actuator 13 is supported on the outer side of the front wall part 1a of the cylinder block 1 via the bracket 20, the radiant heat from the cylinder block 1 is blocked by the bracket 20 so that the transmission of the radiant heat to the hydraulic actuator 13 is suppressed.

Since the hydraulic actuator 13 is disposed on the outer side of the front wall part 1a of the cylinder block 1 near the water pump 8, it is difficult for the heat from the hotter parts of the cylinder block 1 to be transferred to the hydraulic actuator 13.

Since these factors suppress in a change in the damping characteristics of the hydraulic actuator 13, the reliability of the auto tensioner 10 is improved.

Note that the present invention is not limited to the above embodiments, but may be modified as appropriate within the scope of the claims and within the scope of equivalents thereof.

(1) In the above embodiment, the bracket 20 has the first and second scales 24a and 24b and the work hole 25. However, the present invention is not limited thereto.

For example, although not illustrated, an auto tensioner 10 using a bracket 20 not including at least one of the first and second scales 24a and 24b and the work hole 25 is also included in the present invention.

(2) In the above embodiment, the arm 12 has a catch 12f and an inclined surface 12g. However, the present invention is not limited thereto.

For example, although not illustrated, an auto tensioner 10 using an arm 12 without at least one of the catch 12f and the inclined surface 12g is also included in the present invention.

(3) In the above embodiment, the first and second scales 24a and 24b are straight grooves. However, the present invention is not limited thereto.

For example, although not illustrated, the first and second scales 24a and 24b may be straight protruding strips.

INDUSTRIAL APPLICABILITY

The present invention can be suitably used, for example, in the attachment structure of an auto tensioner that automatically adjusts the tension of a belt that transmits rotational power of the crankshaft of a water-cooled engine to an auxiliary machine.

The invention claimed is:
1. An attachment structure of an auto tensioner that is configured to automatically adjust tension of a belt wrapped around a crank pulley and an auxiliary pulley disposed on one side surface of a cylinder block of an engine, wherein:
the auto tensioner is attached to the one side surface of the cylinder block via a bracket, the auto tensioner comprises:
a tension pulley that is pressed against the belt;
an arm that rotatably supports the tension pulley and is swingably supported by the bracket; and
a hydraulic actuator that is supported by the arm and the bracket and is configured to adjust a pressing force of the tension pulley against the belt while using a predetermined position of the arm as a fulcrum, wherein the auto tensioner is attached to the one side surface of the cylinder block such that the hydraulic actuator is adjacent to a water pump installed in the cylinder block.

2. The attachment structure of the auto tensioner according to claim 1, wherein:
the hydraulic actuator is a direct-acting cylinder,
the tension pulley is supported at one end of the arm in a longitudinal direction,
one end of the hydraulic actuator in a direction of extension and retraction is supported at the other end of the arm in the longitudinal direction,
a middle portion of the arm in the longitudinal direction is swingably supported by the bracket via a support shaft, and
the other end of the hydraulic actuator in the direction of extension and retraction is supported by a predetermined portion of the bracket.

3. The attachment structure of the auto tensioner according to claim 1, wherein the bracket includes a stopper configured to restrict extension of the hydraulic actuator beyond a predetermined limit.

4. The attachment structure of the auto tensioner according to claim 1, wherein a scale configured to indicate a swinging angle of the arm and an indicator configured to point to the scale are disposed on the bracket and the arm, respectively.

5. The attachment structure of the auto tensioner according to claim 4, wherein:
the bracket has a work hole through which a support fixture to restrict the swinging angle of the arm passes, and
the arm includes a contacting portion configured to contact the support fixture.

6. The attachment structure of the auto tensioner according to claim 4, wherein:
the scale includes a first scale and a second scale, and
the arm is configured such that the indicator moves between the first and second scales based on a stretched state of the belt.

7. The attachment structure of the auto tensioner according to claim 1, wherein the water pump is disposed in an interior of the cylinder block and is connected to a water channel disposed in the interior of the cylinder block, and
the hydraulic actuator is disposed exterior to the cylinder block.

8. The attachment structure of the auto tensioner according to claim 1, wherein the bracket includes a first portion disposed at an angle to a second portion.

9. The attachment structure of the auto tensioner according to claim 8, wherein the first portion is integral with the second portion.

10. The attachment structure of the auto tensioner according to claim 9, wherein:
the bracket includes a stopper configured to restrict extension of the hydraulic actuator beyond a predetermined limit, and
the stopper is disposed at a connecting portion of the first and second portions.

11. An engine comprising:
a cylinder block;
an auto tensioner attached to a side of the cylinder block via a bracket, wherein the auto tensioner is configured to automatically adjust tension of a belt wrapped around a crank pulley and an auxiliary pulley disposed on the side of the cylinder block, wherein the auto tensioner comprises:
a tension pulley that contacts the belt;
an arm that rotatably supports the tension pulley and is pivotably supported by the bracket; and
a hydraulic actuator that is supported by the arm and the bracket and configured to adjust a pressing force of the tension pulley against the belt while using a predetermined position of the arm as a fulcrum,
wherein the bracket includes a protrusion configured to be engaged by a first tool.

12. The engine of claim 11, wherein the hydraulic actuator is a direct-acting cylinder.

13. The engine of claim 12, wherein the tension pulley is supported at a first end of the arm.

14. The engine of claim 13, wherein:
a first end of the hydraulic actuator is supported at a second end of the arm that is opposite the first end of the arm;
a middle portion of the arm between the first and second ends of the arm is pivotably supported by the bracket via a support shaft; and
a second end of the hydraulic actuator opposite the first end of the hydraulic actuator is supported by the bracket.

15. The engine of claim 11, wherein the bracket includes a first portion disposed at an angle to a second portion.

16. The engine of claim 15, wherein a middle portion of the arm is pivotably supported by the first portion of the bracket and an end of the hydraulic actuator is supported by the second portion of the bracket.

17. The engine of claim 11, wherein the bracket includes a first scale and a second scale, wherein the arm includes an indicator, and wherein the bracket and the arm are configured such that the indicator moves between the first and second scales based on a stretched state of the belt.

18. The engine of claim 11, wherein the bracket includes a hole configured to be engaged by a second tool different than the first tool.

19. The engine of claim 18, wherein the arm includes a surface configured to contact the second tool when the second tool is engaged with the hole.

20. An attachment structure of an auto tensioner that is configured to automatically adjust tension of a belt wrapped around a crank pulley and an auxiliary pulley disposed on one side surface of a cylinder block of an engine, wherein:
the auto tensioner is attached to the one side surface of the cylinder block via a bracket, the auto tensioner comprises:
a tension pulley that is pressed against the belt;
an arm that rotatably supports the tension pulley and is swingably supported by the bracket; and
a hydraulic actuator that is supported by the arm and the bracket to adjust a pressing force of the tension pulley against the belt while using a predetermined position of the arm as a fulcrum,
the bracket includes a first scale and a second scale,
the arm includes an indicator, and
the bracket and the arm are configured such that the indicator moves between the first and second scales based on a stretched state of the belt.

* * * * *